United States Patent [19]

Eschrich et al.

[11] Patent Number: 4,577,143
[45] Date of Patent: Mar. 18, 1986

[54] METHOD AND APPARATUS TO CONVERT AN ELECTRICAL VALUE INTO A MECHANICAL POSITION BY USING AN ELECTROMAGNETIC ELEMENT SUBJECT TO HYSTERESIS

[75] Inventors: Gerhard Eschrich, Gerlingen; Josef Juhasz, Vaihingen; Manfred Schwab, Gerlingen, all of Fed. Rep. of Germany

[73] Assignee: Robert Bosch GmbH, Stuttgart, Fed. Rep. of Germany

[21] Appl. No.: 650,356

[22] Filed: Sep. 13, 1984

[30] Foreign Application Priority Data

Oct. 8, 1983 [DE] Fed. Rep. of Germany ....... 3336629
Mar. 3, 1984 [DE] Fed. Rep. of Germany ....... 3407952

[51] Int. Cl.⁴ .......................... H02P 5/28; H01H 47/00
[52] U.S. Cl. ..................................... 318/701; 361/146
[58] Field of Search ............... 318/653, 632, 676, 701; 361/146, 143, 159, 204, 206; 307/417, 418; 335/234, 220, 284

[56] References Cited

U.S. PATENT DOCUMENTS

| | | | |
|---|---|---|---|
| 2,441,984 | 5/1948 | Armstrong | 361/143 X |
| 2,963,643 | 12/1960 | Brown | 361/143 X |
| 3,683,239 | 8/1972 | Sturman | 335/234 X |
| 4,221,163 | 9/1980 | Anderson | 335/224 X |
| 4,306,207 | 12/1981 | Tada | 335/234 |
| 4,359,765 | 11/1982 | Mimura | 335/284 |
| 4,383,234 | 5/1983 | Yatsushiro | 335/234 X |

Primary Examiner—William M. Shoop, Jr.
Assistant Examiner—Patrick C. Keane
Attorney, Agent, or Firm—Frishauf, Holtz, Goodman & Woodward

[57] ABSTRACT

To eliminate the effect of hysteresis when electrical energy is supplied to an electromagnetic positioning element, for example to an electromagnetic valve, upon change in sign of the electrical energy which is provided from a previously occurring change, additional electrical energy is supplied if the change in energy is counter the direction of the magnetization curve. The extent of the additional energy may be at least as great as the gap between the ascending and descending branches of the hysteresis curves (H1, H2), or may be a quantity obtained by experience or measurement if the gap between the hysteresis curves is known or determinable. If the electromagnetic energy applied is in excess of that for reversal of magnetization, it may be applied for a period of time which is just long enough to permit remagnetization of a magnetic portion of the electromagnetic apparatus (11) but not long enough to cause change in a mechanical output thereof.

18 Claims, 5 Drawing Figures

METHOD AND APPARATUS TO CONVERT AN ELECTRICAL VALUE INTO A MECHANICAL POSITION BY USING AN ELECTROMAGNETIC ELEMENT SUBJECT TO HYSTERESIS

The present invention relates to electromagnetic positioning apparatus in which an electrical quantity, such as a voltage, a current, or the like, is to be converted to a mechanical position, or a mechanical force, by using an electromagnetic element which is subject to hysteresis upon reversal of the direction of magnetization, and more particularly to such a method and apparatus in which the mechanical value, e.g. position, force, pressure, or the like, will be exactly proportional to the electrical value, and changes in mechanical value will be proportional to changes in the electrical value, regardless of the direction of change.

BACKGROUND

Various electromagnetic positioning elements are known, for example pressure control valves for use in electrically controlled gear shift systems (see, for example, German Patent Disclosure Document No. DE-OS 26 58 969). Other types of electromagnetic positioning or force generating elements are known, for example electromagnetic positioning elements which position a body in a predetermined location, against the bias force of a spring.

The transfer characteristics between an electrical parameter or value and the mechanical force or position includes hysteresis, since the magnetizing force—magnetization curve of electromagnetic elements includes hysteresis. FIG. 2 illustrates a portion of a typical B-H curve, in which the abscissa represents a magnetizing current, and the ordinate a resultant output value, for example, force, speed, pressure, a positioning distance or the like. The hysteresis is formed by two portions, namely a friction hysteresis and magnetic hysteresis. Frictional hysteresis and inaccuracies can be overcome, or at least reduced to a tolerable level, by modulating the control current with a low-frequency modulation. The magnetic hysteresis can be reduced by utilizing magnetic material based on pure iron and other high-quality materials. Such materials are expensive and difficult to handle. The presence of hysteresis—regardless of whether it is high or low—makes it more difficult to provide exact proportionality between an electrical parameter and a mechanical value, since the extent or degree of hysteresis varies over the extent of the characteristic curve. Tolerances in manufacture and tolerances within the materials used lead to further variations in hysteresis. The gap between the respective curves defining the hysteresis relationship is not precisely determined, and upon change of an input parameter counter the direction of hysteresis, it is not always possible to obtain an output parameter or output condition which will be precisely proportional to the input parameter and predetermined on a fixed point on the characteristic transfer curve between current and mechanical output value, for example.

THE INVENTION

It is an object to provide a positioning system which permits the use of easily worked, inexpensive ferromagnetic material, such as ordinary electrical sheet steel, while still providing for precise positioning of an output value on a predetermined point of the characteristic transfer curve between input/output, so that a mechanical output value can be obtained which can be predetermined.

Briefly, the operating point of an electromagnetic apparatus is first predetermined to lie on one of the curves of the hysteresis characteristic, for example on the ascending curve, that is, the curve which the electromagnetic element follows when the current value increases. If, then, upon a change of the input value, the change is in the same direction as that of the selected characteristic curve, the respective current value, which is needed to affect the proportional output change, is applied to the electromagnetic apparatus. If, however, the change is in a direction counter that of the direction of the selected curve, electrical energy is applied in excess of that required to move the electromagnetic apparatus to the required position, which excess is at least as great as that required to effect reversal of magnetization to overcome the hysteresis gap between the magnetization curves. This excess value is applied for a very short time only, for example only for the period of time necessary to effect remagnetization. Since the value to be transduced will, then, have that value which is in the same direction of the selected characteristic, e.g. increasing, the value to be transduced will follow the selected magnetization curve and, hence, provide a precisely predetermined output, e.g. position, force, pressure or the like.

If the width of the gap between the respective hysteresis curves is known, the added value can be determined to be exactly that of the width of the gap; if not, just slightly more than the expected or previously measured gap can be added.

The method, and the apparatus—which includes a network adding, for a short period of time, the requisite factor—have the advantage that in effect a recursive approximation is obtained to result in real-time compensation for hysteresis. The compensation is unambiguous, and no hunting or overrun will result.

DETAILED DESCRIPTION

Figure 1:
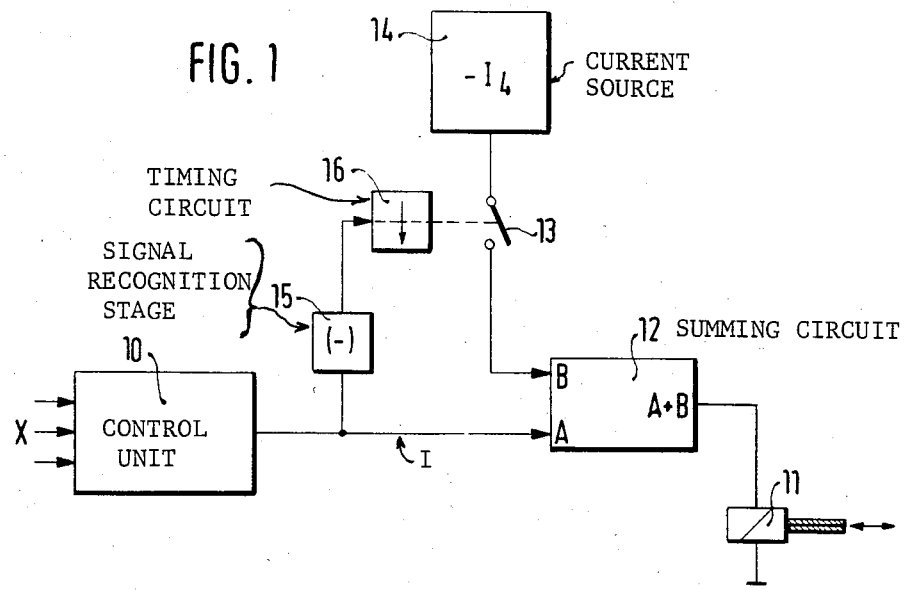
FIG. 1 is a schematic block diagram of an apparatus carrying out the method in accordance with the present invention.

An electronic control system 10, which may be of any desired type receiving input signals having various input parameters X, provides an output control signal of value I. The control signal is applied to an electromagnetic positioning element 11 illustrated, for example, as a solenoid coil which positions an armature more or less withdrawn into the coil in dependence on the current flowing through the solenoid. The electronic control unit 10 may, for example, be the control unit of an electronic gear shift control system for automotive vehicles. The electromagnetic positioning element 11 is the pressure controller used in connection with the gear shift controller which, in dependence on input parameters, provides a predetermined output control pressure by, for example, controlling the opening of a pressure control valve which is connected to a source of pressurized hydraulic fluid. The current I flowing through the unit 11 will be a function of the respective input parameters X and should, always, command a pressure or a position, respectively, of the unit 11 which has a predetermined relationship to, or is a predetermined function of, the current delivered by the control unit 10. Rather than controlling pressure, other mechanical parameters can be controlled, for example a predetermined deflection, a predetermined application of force on a medium, or the like.

The electrical current I is provided to the positioning element 11 through a summing circuit 12. The summing circuit receives the current I at an input terminal A and may receive, further, a fixed electrical signal, for example an electrical current $-I4$ in dependence on the position of a control switch 13. The current $-I4$ is generated in a signal generating stage 14 which, for example, can be a constant current source, for example a suitably controlled transistor. The currents are added by suitably connecting currents I and $-I4$ over resistors. The electrical parameter I is, further, applied to a sign recognition or sensing stage 15 which, in turn, is connected to the trigger input of a timing circuit 16 which controls the switch 13. The sign recognition stage 15 recognizes the direction of change of the electrical signal I from a previous change. The sign recognition stage 15 provides an output only if the change is negative, that is, is in a direction towards a decrease of current I. In its simplest form, the sign recognition stage is a differentiator with a diode coupled to its output. Upon triggering of the timing circuit 16, switch 13 will close for the timing interval set into the timing circuit 16.

Figure 2:
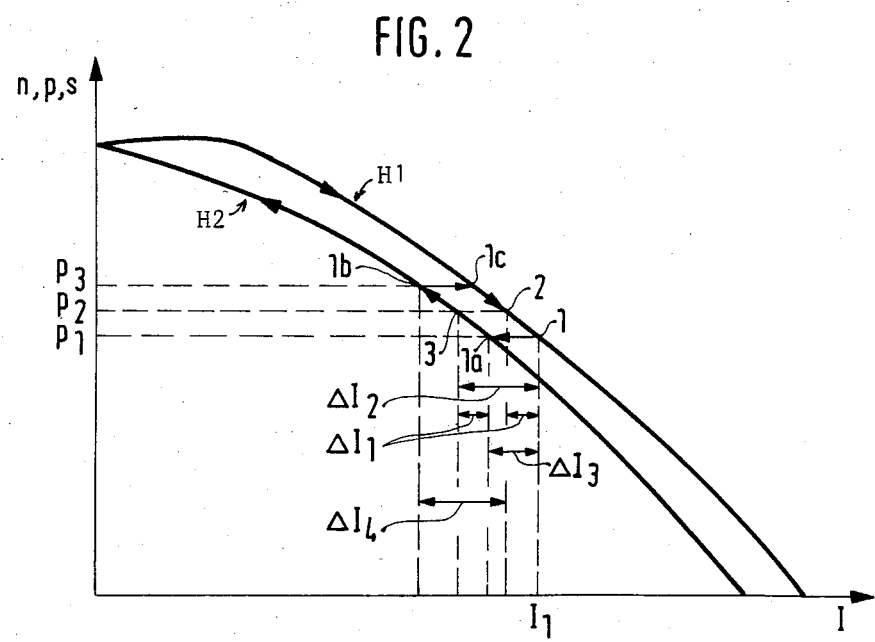
FIG. 2 is a hysteresis diagram used in explaining the operation of the system of FIG. 1, and the method of the invention.

Operation, with reference to FIG. 2: Any desired mechanical output level which, for example, in FIG. 2 is illustrated as pressure p, is set to be controlled on only one of the two hysteresis chracteristic curves. In the example selected, this is the upper hysteresis curve, which, for example, is the curve represented by increasing current. If the pressure is to be reduced, then this is no problem, since in that case increase of electrical current will occur on the upper curve which is representative of the resulting pressure upon an increase in current I. If it is intended, however, to increase the pressure, so that the current will have to be reduced, for example by increasing the opening of a pressure control valve, the apparatus would, normally, change over to the lower hysteresis curve. The distance or gap between the hysteresis curves may not be known and, in the present example, it is asssumed to be not precisely known.

Let it be assumed that the pressure p1 is to be increased to a pressure level p2. The current at operating point 1 is I1. In order to reach the pressure level p2 on the upper curve, the control current must be decreased by $\Delta I1$. This, however, is counter the direction of the hysteresis curve, and the operating point switches to the lower hysteresis curve. If the gap between the hysteresis curves, that is, the hysteresis width, were precisely known, the control current I1 could be decreased by the value $\Delta I3$ as well as $\Delta I1$ which, together, have the difference $\Delta I2$. The pressure p2 would then be commanded, and the operating point would be point 3 on the lower hysteresis curve. Since, however, the value $\Delta I3$—as above noted—is not precisely known, and is subject to variations due to manufacturing and metal tolerances and other unknowns, the present invention departs from this empirical method.

In accordance with the present invention, the current I1 is decreased by the value $\Delta I1$, as above, but, in addition, by a short additional decrease of $\Delta I4$. This will result, initially, in a change-over of the operating point from point 1 to point 1a on the lower curve, then up on the lower curve to 1b, and, as soon as the value $\Delta I4$ is disconnected, a transition of the operating point to 1c, and then to the desired operating point 2. As can be seen, operating point 2 will have the resultant desired pressure p2, and is on the upper hysteresis curve. The dual transition through the gap of the hysteresis curves, in opposite directions, effectively eliminates the hysteresis gap, and, hence, it need not be known precisely. It is only important that the value $\Delta I4$ is greater than the maximum known or expected distance between the hysteresis lines H1, H2 for, respectively, the upper and lower hysteresis lines.

The system of FIG. 1 carries out this method in that the stage 15 senses that the control current I is dropping, that is, a change in negative direction. This triggers the timing circuit 16 which closes switch 13 and adds the current $-I4$ to the summing circuit 12 which, then, is added to the control current I which has been reduced by the value $\Delta I1$, that is, causes an additional reduction of the current by the value $\overline{I4}$. After the timing interval of the timing circuit 16 has elapsed, switch 13 is opened, which disconnects the value $-I4$ and, since the current now will rise with respect to the immediately preceding current which included $-I4$, the operating point will shift from point 1c to point 2 on the upper hysteresis curve H1.

The timing duration of the timing circuit 13 preferably is so selected that the resulting mechanical output, in the example selected the pressure, cannot follow the hysteresis curve which, of course, operates at electromagnetic speeds, so that the pressure p3 will never be reached. The remagnetization and change in magnetization which eliminates the hysteresis effects may, however, proceed.

Of course, the method of the present invention may also be used in the opposite sense, that is, on the lower hysteresis curve H2. The method is then carried out in the reverse, that is, with signs reversed. If an increase in pressure is desired, then it can be directly controlled; if a decrease in pressure is desired, a positive current value I4 is added for a short period of time.

FIG. 1 illustrates the basic block diagram of the system; of course, the control unit 10, the summing circuit 12, the sign recognition stage 15, timing circuit 16, and switch 13, as well as the current source 14, can all be placed on a single chip, in the form of an integrated circuit (IC), and using, for example, microcomputer components or a microcomputer chip.

Figure 3:
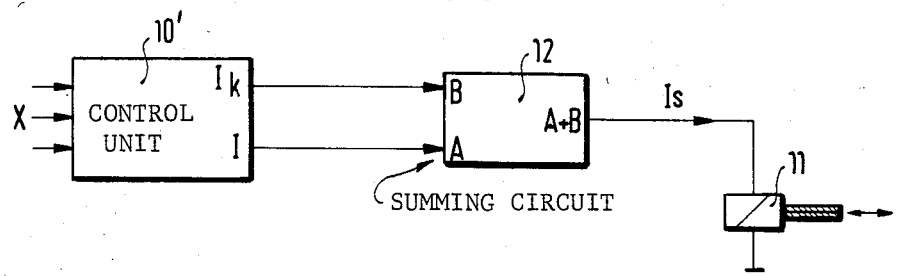
FIG. 3 is a schematic block diagram of a second embodiment of the invention.

Embodiment of FIG. 3: The control unit 10' is combined with other components of the system in form of a single microcomputer, the functions of which will be explained in detail below. Thus, the control unit 10' receives input signals X, generates a control current I and a correction current $I_K$, and applies the two currents I, $I_K$ to respective inputs A, B of the summing circuit 12, which provides an output current Is to the positioning element 11. The control signal at the input B of the summing circuit 12 is thus derived directly from the control unit 10', formed as a microcomputer, without requiring additional circuit elements. The control current is generated somewhat differently, which solves the same problem in a somewhat different manner. As in the preceding example, the summing circuit 12 provides operating current to the positioning element 11. Amplifiers and the like which may be required have been omitted for clarity of the drawings, and, of course, can be used in accordance with standard engineering practice.

Figure 4:
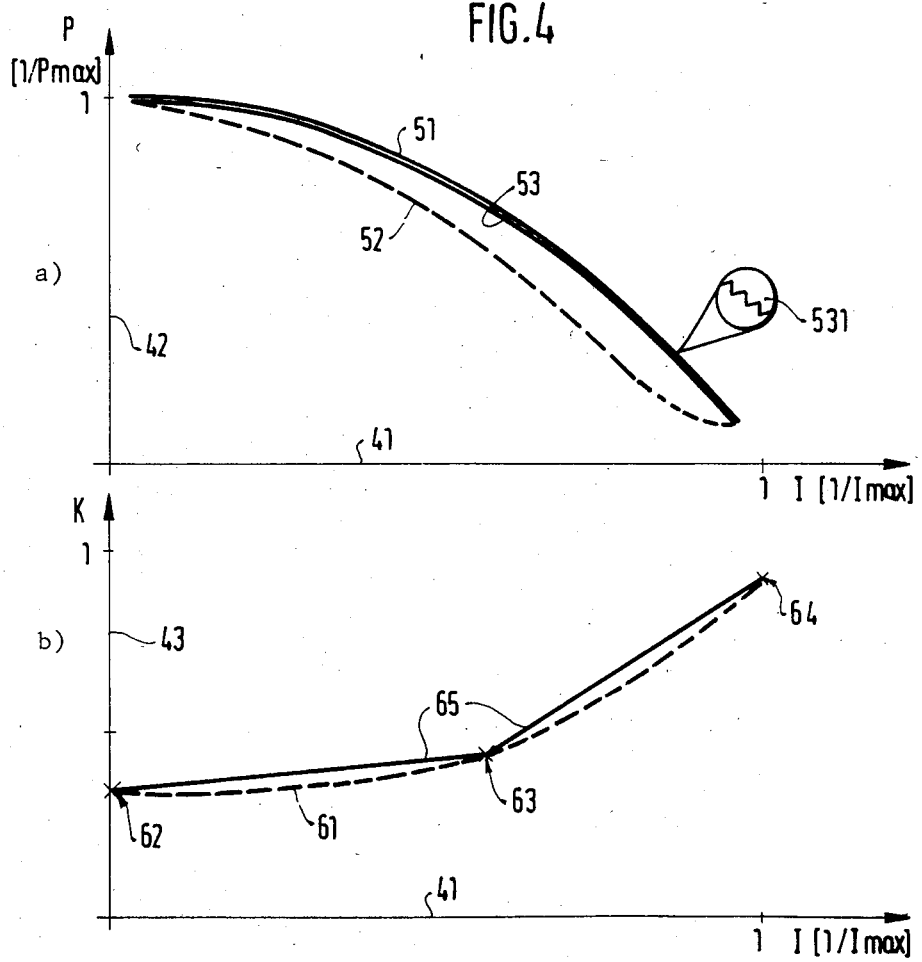
FIG. 4 is a pair of graphs (a) and (b) showing, respectively, a stepped-curve linear approximation of a current-pressure hysteresis characteristic calculated by the system of FIG. 3, and a K-field interpolation refining the linear approximation.

Method of control, and operation, with reference to FIG. 4: The upper half of a current-pressure characteristic of the positioning element 11 is shown in FIG. 4. The ordinate, for example for pressure 42, is drawn with respect to the abscissa 41 for the current I. The current-pressure characteristic, as in the first example shown in FIG. 2, has hysteresis, with an upper characteristic 51 and a lower hysteresis curve 52. The upper characteristic or curve will be followed by the element 11 as current rises and pressure drops; the lower characteristic 52, which is shown in broken lines, is the characteristic transfer curve for dropping current, and increasing pressure.

For some electromagnetic structures, it is possible to calculate or determine experimentally magnetic hysteresis curves and the maximum hysteresis width or the gap between the rising and falling branches of the curves, so that, given a specific material, the shape and gap of the hysteresis curves will be known. For example, some electromagnetic materials will have essentially similar characteristic hysteresis curves if suitably heat-treated, for example heated to incandescence. The curves can then be generated with sufficient accuracy. The precise course of magnetization depends on the prior magnetic history of the material which is very complex and can be calculated only with great difficulties by means of implicit equations. The necessary calculations for exact compensation are substantial. It is possible, however, to utilize a suitable approximation. Based on the approximation, a compensation current is determined which compensates for the respective magnetic hysteresis in order to obtain an unambiguous current-pressure characteristic, that is, a characteristic which is independent of the prior change in current, and hence in pressure, and will, regardless of this prior change, associate a predetermined pressure with a predetermined current.

The current-pressure characteristic of the positioning element 11 is first determined on one of the hysteresis curves, for example the upper one—curve 51—that is, with rising current. This first determined characteristic will then form the basic characteristic curve. By use of an approximately calculated compensation, the almost compensated characteristic 53 is then obtained. If the compensation would be ideal, curves 51 and 53 would be congruent. For most actual uses, however, an approximation, for example as shown in FIG. 4, is sufficient. Compensation for the gap between the hysteresis curves 51, 52 can be obtained by forming a linear approximation for the curves; this substantially reduces apparatus, and calculating requirements. Consequently, the hysteresis curve is divided into sections, for example each half-cycle of the hysteresis curve is approximated by a straight line. The linear approximation for the compensation may be used, of course, only to the extent that the maximum width of the gap between the hysteresis curve is not exceeded. This can readily be obtained within the usual operating limits.

At each point of the basic characteristics, an initial rising slope of magnetization is determined; in other words, a factor k which represents the differential relationship of pressure to current can be obtained. The factor k is proportional to the initial slope of the magnetization. The lower graph, graph b, of FIG. 4 which, of course, is drawn in vertical alignment with graph a thereof, illustrates the lower half of the k characteristic 61 in dependence on current I.

Referring again to FIG. 3: The control unit 10', as in the first example (FIG. 1), will provide an electrical current I in dependence on input parameters X. The current I is applied to the input A of the summing circuit 12. Simultaneously with this adjustment, an endless loop of an algorithm is controlled to run within the control unit 10' which, in dependence on the electrical current I, calculates the correction value $I_K$. This algorithm measures, during each run of the loop, a change in accordance with the following relationship:

$$\Delta I = I(t-1) - I(t) \tag{1}$$

The time variable t is determined by the coursing time through the calculation of the algorithm.

Graph b of FIG. 4 illustrates that the k characteristic can be approximated by two straight lines 65, which, respectively, extend from point 62 to point 63, and from point 63 to point 64. These interpolation straight lines 65 are entered into the algorithm as a fixed program representing a curve.

If, within one cycle of the algorithm, it is determined that $$\Delta I \neq 0 \tag{2}$$

then a correcting value of $$\Delta I_K = \Delta I \cdot k(I) \tag{3}$$

is calculated. A correction level as a function of time is $$I_K(t) = I_K(t-1) + \Delta I_K \text{ wherein } 0 < I_K < I_H \tag{4}$$

In the above formula, $I_K$ is the correction level; and $I_H$ the maximum width of the hysteresis gap of the current-pressure characteristic of the positioning element 11.

FIG. 4, graph a, illustrates the current correcting characteristic. An enlargement of the actual characteristic is shown at the enlargement zone 531. The enlargement clearly shows that the characteristic 53 actually is a stepped curve, the steps being caused by the cycling time of the compensating algorithm.

The correcting value $I_K$ is in a region between 0 and $I_H$—in which, $I_H$ is the maximum width of the hysteresis curve of the current-pressure characteristics of the element 11. The measured width of the hysteresis curves, $I_H$, is a value which depends on the material of the positioning or pressure controlling element 11 and which, upon suitable treatment of the material, for example by heating to incandescence or the like, can be rendered substantially constant.

The method in accordance with the second embodiment, FIGS. 3 and 4, has the advantage with respect to the first embodiment, FIGS. 1 and 2, that, in this compensation, an excess pressure which is then again reduced will not arise—compare explanation in connection with FIG. 2, and particularly the pressure path between point $1_c$ and 2 on curve H1 of FIG. 2. In other words, upon moving from point 1 to point 2 in FIG. 2, a pressure of P2 will occur after a pressure of P1 without going first to the pressure P3 as a transitional pressure. But material characteristics must be known and remain stable.

Of course, the lower hysteresis curve as the basic curve may also be used in this system. The correction algorithm then need be modified only by changing the sign of $\Delta I$ which, within software, poses no problem at all.

In accordance with a further feature of the invention, the compensation algorithm can be further improved; it is particularly desirable to replace the linear approximation of the hysteresis curve by an approximation which considers the curvature of the hysteresis curve as such. This is possible, for example, by constructing a compensation or K-field rather than the simple characteristic curve 61 (FIG. 4, graph b), which is dependent on the distance of the electrical quantity I to the reversal point, that is, to the initial point of the then instantaneously considered hysteresis curve. Mathematically:

$$k = K(I, \Delta I_u)$$

wherein $\Delta I_u = |I - I_u|$ wherein $I_u$ is the value or level of the positioning current I at which the algorithm has determined that a change in sign of $\Delta I$ has occurred. By storing, for example in a read-only memory (ROM), the respective transition points, corresponding, for example, to a multiplicity of points 63 (FIG. 4, graph b), it is possible to interpolate within the characteristic field K.

Various changes and modifications may be made, and features described herein may be used with any of the others, within the scope of the inventive concept. Further, some of the structural elements described may be realized by software, for example the switching function of the switch 13 in FIG. 1 can be replaced by suitable routing of currents in accordance with a prior commanded program.

We claim:

1. In an electromagnetic positioning apparatus subject to magnetic hysteresis and having a mechanical element movable among a plurality of desired positions, each corresponding to an electrical input value of said apparatus, by furnishing electrical energy to said apparatus,
    wherein a characteristic plot of the value of an electrical input parameter, selected from the group consisting of current (I) and voltage, against the value of a mechanical output parameter (n,p,s) of said apparatus, defines a rising magnetization curve (H2, 52) as said output value rises and a falling magnetization curve (H1, 51) as said output value falls, said curves defining a remagnetization hysteresis gap therebetween, and the respective values of said input and output parameters at any given time together defining an operating point (1,2,3) on one of said curves,
    and wherein said hysteresis, without compensation, results, when said input value has both risen and fallen from an initial input value, in inconsistent initial and subsequent mechanical output values for the same electrical input value,
    a method of compensating for the effect of said hysteresis so as to produce a unique mechanical output value for any given electrical input value, comprising the steps of:
    (a) determining whether the operating point has, due to a change in the value of said electrical input parameter, continued along the same magnetization curve, or, conversely, has undergone a change-over to the other of said curves, due to a reversal of polarity or the direction of said parameter change,
    (b) if a reversal of polarity has occurred, furnishing to said electromagnetic apparatus sufficient electrical energy, not only to move said mechanical element of the electromagnetic apparatus between positions, but also to effect reversal of magnetization of the electromagnetic apparatus, to overcome the hysteresis gap between said curves (H1, 51; H2, 52).

2. Method according to claim 1 in which said step of furnishing sufficient electrical energy comprises
    adding electrical energy in the form of an electrical signal for a predetermined period of time and then discontinuing said added signal, the energy within said added signal being at least as great as that required to effect reversal of magnetization.

3. Method according to claim 2, wherein the time is determined to be below that during which the electrical energy is converted into mechanical energy by said electromechanical apparatus (11), but sufficient to permit remagnetization of a magnetic portion of said electromechanical apparatus.

4. Method according to claim 2,
    wherein the step of adding said electrical signal includes adding said electrical signal to an amount of electrical energy sufficient to move said operating point between two points on a single selected magnetization curve representing respective positions of said mechanical element.

5. Method according to claim 4, wherein the time is determined to be below that during which the electrical energy is converted into mechanical energy by said electromechanical apparatus (11), but sufficient to permit remagnetization of a magnetic portion of said electromechanical apparatus.

6. Method according to claim 2,
    wherein the direction of increasing electrical input parameter values (I) defines the direction of said falling magnetization characteristic curve (H1, 51) and the direction of decreasing electrical input parameter values (I) defines the direction of rising magnetization characteristic curve (H2, 52),
    and including the steps of
    sensing the increasing or decreasing direction of change of the electrical value from the electrical value which, together with the mechanical output value, defines the then-current operating point and determining the following conditions:
    (a) the change is in the same direction as that of the characteristic magnetization curve on which said then-current operating point lies;
    (b) the change is counter the direction of the characteristic of the magnetization curve; and
    furnishing the added electrical signal if condition (b) is sensed.

7. Method according to claim 1 including the steps of
    obtaining an electrical signal ($-I_4$, $I_K$) representative of the hysteresis gap between the magnetization curves (H1, 51; H2, 52) defining the hysteresis characteristic; and
    upon a change of the electrical input parameter value (I) which, together with the mechanical output value, defines the then-current operating point, in a direction counter the direction of the characteristic curve on which said then-current operating point lies, adding said electrical signal ($-I_4$, $I_K$) to the electrical input value (I) controlling the electromagnetic apparatus.

8. Method according to claim 7, wherein the electrical signal ($I_J$) is generated simultaneously with the electrical input value (t) IK controlling the electromagnetic apparatus (11) in accordance with the relationship:

$$\Delta I_K = \Delta I \cdot k \text{ and } 0 \leq I_K \leq I_H$$

wherein:
$\Delta I_K$: change in said electrical signal;
$\Delta I$: change in the electrical input value (I) being applied to the positioning apparatus (11);
k: correction factor in dependence on the applied electrical energy;
$I_H$: maximum gap of the hysteresis curves;
and wherein the correction factor k represents, at least approximately, the hysteresis gap for each change of the electrical energy ($\Delta I$) supplied to the electromagnetic apparatus.

9. Method according to claim 8, wherein the maximum hysteresis gap $I_H$ is a function of the absolute electrical energy (I) being supplied, namely:

$$I_H = I_H(I).$$

10. Method according to claim 8, wherein the correction factor k is a function of the absolute value of the electrical energy (I) supplied to the electromagnetic apparatus, namely:

$$k = k(I).$$

11. Method according to claim 9, wherein the correction factor k is a function of the absolute value of the electrical energy (I) supplied to the electromagnetic apparatus, namely:

$$k = k(I).$$

12. Method according to claim 8, wherein the correction factor k is a function of the distance, on a graph, of the electrical value to a reversal point ($I_u$), namely:

$$k = k(\Delta I_u).$$

13. Method according to claim 9, wherein the correction factor k is a function of the distance, on a graph, of the electrical value to a reversal point ($I_u$), namely:

$$k = k(\Delta I_u).$$

14. Method according to claim 9, wherein the correction factor (k) is determined by at least two arbitrarily selected points on a graph of experimentally determined gap of the hysteresis curves with respect to electrical energy being supplied to the positioning apparatus (11);
and the actual correction factor used is interpolated between said at least two points.

15. Method according to claim 14, wherein said interpolation between said at least two points is linear.

16. Apparatus to carry out the method of claim 4, comprising
means (10) for providing a controlled source of electrical energy, which is to be converted into mechanical energy, connected to and controlling application of the electrical energy to the electromagnetic energy conversion apparatus (11);
means (14) for providing additional electrical energy to the electromagnetic apparatus (11);
a summing circuit (12) connected to sum the additional energy and the electrical energy provided by the electrical energy providing means (11) and furnishing the combined energy to said electromagnetic apparatus;
and controlled timing means (13, 16) connecting said additional energy to the summing means (12) during a timing interval which is sufficient to effect reversal of magnetization of the electromagnetic apparatus, but insufficient for conversion thereof into mechanical energy.

17. Apparatus according to claim 16, further including a sign recognition stage (15) connected to receive the sign of change of said electrical energy supplied by the controlled source means (10), said sign recognition stage controlling application of said additional electrical energy from the additional energy being applied to the summing means only if the sign of the change of the electrical energy from said source means (10) is counter the direction of the magnetization curve on which the electromagnetic apparatus (11) operates, thereby requiring reversal of magnetization of the magnetic portion thereof.

18. Apparatus for carrying out the method of claim 7, including an electrical control unit (10') furnishing
(a) electrical energy for conversion into mechanical energy in accordance with a predetermined proportionality function; and
(b) additional electrical energy in form of an electrical signal ($I_K$) representative of current required for remagnetization of a magnetic portion of the electromagnetic apparatus (11); and
a summing circuit (12) receiving both the electromagnetic energy and said additional energy and generating a current ($I_s$) for application to said electromagnetic apparatus (11) which is proportional to the sum of the electrical energy (I) and of the additional electrical signal ($I_K$),
said control unit generating said additional signal as a function of the hysteresis gap of the magnetic portion of said electromagnetic apparatus (11).

* * * * *

UNITED STATES PATENT AND TRADEMARK OFFICE
CERTIFICATE OF CORRECTION

PATENT NO. : 4,577,143
DATED : March 18, 1986
INVENTOR(S) : Gerhard ESCHRICH et al It is certified that error appears in the above-identified patent and that said Letters Patent is hereby corrected as shown below:

Column 9, line 7 (claim 8, line 2) change $I_I$ to -- $I_K$ --

Column 9, line 8 (claim 8, line 3) change "(t)IK" to -- I --

Signed and Sealed this

Twelfth Day of August 1986

[SEAL]

Attest:

Attesting Officer

DONALD J. QUIGG

Commissioner of Patents and Trademarks